United States Patent [19]

Stancliff

[11] 3,810,387

[45] May 14, 1974

[54] APPARATUS FOR RECORDING BOREHOLE CONDITIONS AT THE SURFACE

[75] Inventor: Thomas H. Stancliff, Houston, Tex.

[73] Assignee: Sperry-Sun Well Surveying Company, Sugar Land, Tex.

[22] Filed: Dec. 8, 1972

[21] Appl. No.: 313,367

[52] U.S. Cl. ................................................ 73/151
[51] Int. Cl. ............................................ E21b 47/06
[58] Field of Search ............... 73/151, 152; 340/206

[56] References Cited
UNITED STATES PATENTS 3,394,364   7/1968   Bruce et al. ........................ 340/206
R25,209    7/1962   Kolb ................................ 340/206 X Primary Examiner—Jerry W. Myracle
Attorney, Agent, or Firm—George L. Church; Donald R. Johnson; John E. Holder

[57] ABSTRACT

In a surface recording pressure gauge a bourdon tube is used to detect pressure change. Angular motion generated by the bourdon tube is detected by a scan system which in turn feeds digital data to the surface indicative of pressure change. The surface electronics are conveniently programmed for calibration of the particular gauge and provide computed read-outs of true pressure in psi.

15 Claims, 4 Drawing Figures

APPARATUS FOR RECORDING BOREHOLE CONDITIONS AT THE SURFACE

BACKGROUND OF THE INVENTION

This invention relates to measuring apparatus and particularly to apparatus suitable for use in boreholes for the measurement of wellbore parameters.

In connection with the control of oil producing reservoirs it is frequently desirable to obtain records of variations of pressure with time by means of apparatus located in fluid filled boreholes. The pressure variations coupled with the known history of production or other manipulations of the reservoir give valuable information as to conditions in the reservoir.

For the purpose of making such pressure measurements, gauges have been provided, a well-known type of which has the following characteristics:

A bellows is subjected to the ambient pressure of the environment and contains a liquid which transmits this pressure to the interior of a bourdon tube arranged as a long helix. This action produces rotation of a shaft connected to the free end of the bourdon tube. This shaft is coupled to a scriber which rotates relative to a cylindrical sheet on which it may produce markings. The scriber is also moved axially relative to the sheet by a clock mechanism to provide a time abscissa.

The foregoing type of gauge, however, has various limitations. The use of a mechanical clock limits the period of operation, typically to about 72 hours. In many cases it would be desirable to have the operation extended to much longer periods, such as by electrically operated clocks. Battery-operated clocks on the other hand, are subject to limitations of battery life and the batteries themselves are adversely affected by high temperatures. Also, the accuracy of the recording scriber is subject to change when the length of the helically wound bourdon tube is varied due to pressure changes.

Additionally, downhole recording gauges have the disadvantage of having to be retrieved from the borehole in order to obtain measurements. If continuous data is required as well as intermittent knowledge of such data, it is necessary to run the gauge in and out of the borehole repeatedly. This in turn is a time consuming and expensive operation.

It is therefore an object of the present invention to provide a new and improved instrument for measuring downhole parameters.

SUMMARY OF THE INVENTION

With these and other objects in view, the present invention contemplates a surface recording borehole instrument including means for detecting a borehole parameter and transmitting data indicative thereof to the surface over a single conductor cable, which also carries power to the system. The downhole device includes a parameter detector which positions a switch means relative to a reference switch to indicate changes in the parameter. A scan system detects changes in the relative position of the switches. Provisions are also made to provide relative longitudinal movement between the scan system and the movable detector switch. In addition, the scan system which is gear driven, includes provisions for obviating the effect of a non-linear gear train on the repetition of output data.

DESCRPTION OF THE PREFERRED EMBODIMENTS

Figure 1:
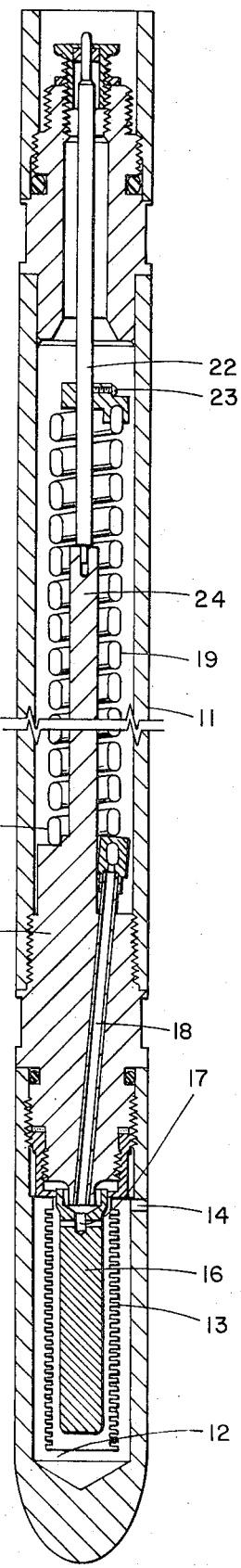
FIG. 1 is an elevational view of an instrument housing including a pressure measuring device.

Referring first to FIG. 1 of the drawings, the apparatus is comprised of a protective housing or casing 11 which, as is usual with borehole instruments, is constructed so as to be capable of withstanding pressures that may be encountered in deep boreholes. A bourdon tube pressure measuring gauge is shown arranged within the casing and is similar in mechanical detail to that used in the past for making such downhole pressure measurements. The lower portion of the gauge is provided with a chamber 12 in which is located a bellows 13. The portion of the chamber external to the bellows is open at its upper end, as indicated at 14, to the external borehole fluid outside the casing so that the pressure of the borehole fluid is transmitted to the bellows. The bellows is arranged about and attached to a bellows spacer 16 which extends into the interior portion of the bellows. Passageways 17 are formed in the upper end of the bellows spacer and connect the outside of the spacer, between the spacer and the bellows, with a pressure tube 18 extending upwardly into fluid connection with the interior of the lower end of a helical bourdon tube 19. The bellows and connecting passageways as well as the bourdon tube are normally filled with a fluid such as oil. The bourdon tube is anchored at its lower end 20 to an element base 21 which in turn supports the upper end of the bellows spacer 16. The element base is fixedly attached to the instrument case 11. The upper end of the helical bourdon tube 19 is attached to a rotatable shaft 22 by means of a coupling 23. Pressure changes applied to the bourdon tube accordingly affect rotation of the shaft. The lower end of the shaft is positioned for rotation in a shaft support 24 which in turn extends downwardly to the element base 21. This shaft in the present apparatus corresponds to a shaft in conventional apparatus which would rotate a stylus in a known matter. The shaft itself is mounted in low friction bearings at its upper and lower ends to permit ease of rotation within its housing.

Figure 2:
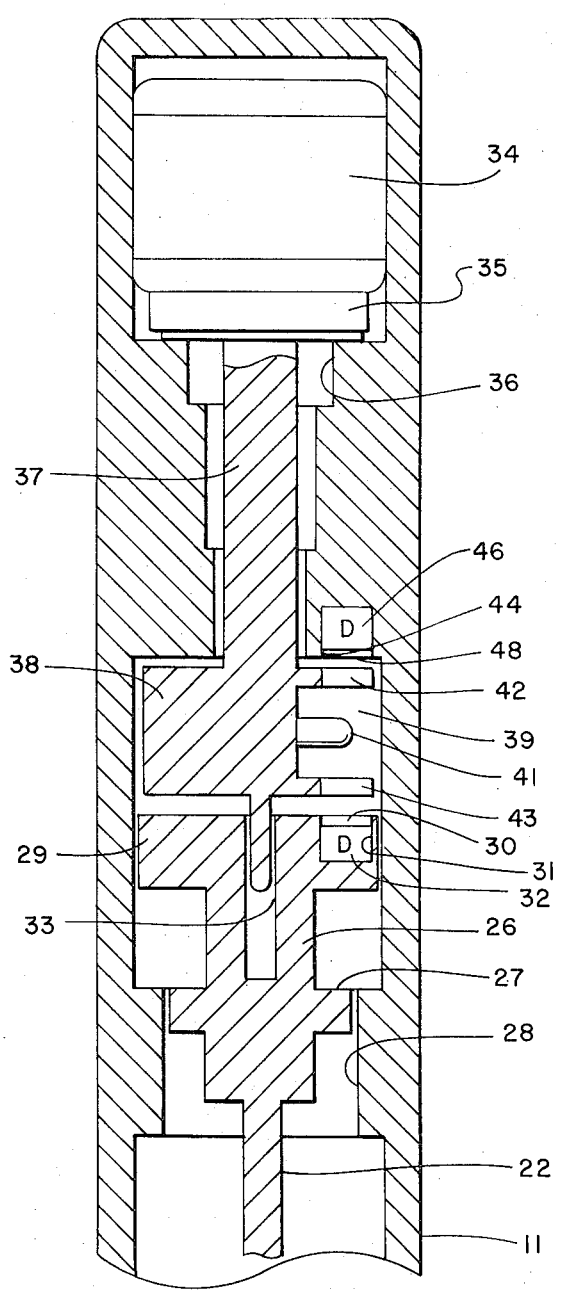
FIG. 2 is a cross sectional elevational view of an instrument housing including means for scanning the output of a downhole measuring device.

Referring now to FIG. 2 of the drawings, the upper end of the shaft 22 is shown connected with a detector head 26. The detector head is fixedly attached to the shaft and has an annular shoulder portion 27 extending from its lower end for centering the mechanism within a mating sliding surface 28 in the bore of the housing 11. An annular shoulder 29 extending outwardly from the upper end of the detector head 26 has a recessed portion 31 therein for receiving a detector photocell 32. A horizontal slit 30 is formed in the head adjacent the detector 32. A longitudinal bore 33 is centrally formed in the upper end of the detector head 26.

At the upper end of the housing 11 in FIG. 2 a scan drive motor 34 is shown supported on shoulders 36 which are formed in the bore of housing 11. A gear train 35 is connected to the output of motor 34. An output shaft 37 from the gear train extends downward through the bore in the housing and has a scanning disc 38 positioned on its lower end. A pin protracts downwardly from the center of the scanning disc and is received in a loose fit within the longitudinal bore 33 in the upper end of the detector head 26. The scanning disc 38 has a recessed portion 39 therein, with a light source 41, such as a lamp, positioned within the recess. Narrowly arranged horizontal upper and lower slits 42, 43 respectively, are provided in the walls of the scanning disc and are arranged to permit light emanating from lamp 41 to be transmitted through the walls of the disk. The wall of the housing 11 above the scanning disc has a recessed portion 44 for receiving a second photo detector cell 46 which will be referred to hereinafter as a case reference detector. A horizontal slit 48 in the housing is positioned adjacent the detector 46. The light source 41 within the scanning disc together with the slits 42, 43, 48 and 30, and the detector cells 32 and 46, are arranged so that when properly aligned, light may be transmitted through the slits and impinge upon the detectors to provide electrical signals as will be hereinafter described. Circuits (not shown) including slip rings or the like are provided for supplying electrical paths to the electrical elements described above.

In the operation of the apparatus thus far described, the instrument housing is assembled and lowered into a borehole by means of a conductor cable from the surface. Suitable connecting means (not shown) are provided at the upper end of housing 11 to provide for the connection of a conductor cable. Downhole fluids which are subjected to reservoir pressures are permitted to enter the chamber 12 at the lower end of the instrument housing by means of opening 14 in the wall of the housing. This fluid pressure in turn acts upon the bellows 13 so that such external pressure is transmitted to the bellows and thus to the fluid within the bellows. Changes in fluid pressure within the bellows is communicated through the passageway 17 and pressure tube 18 to the bourdon tube 19 in the upper end of the instrument housing as shown in FIG. 1. Pressure changes cause the bourdon tube assembly to rotate about its longitudinal axis, with such rotation being transmitted to the shaft 22. Rotation of shaft 22 turns the detector head 26, which is attached to the upper end of the shaft. Rotation of the detector head moves the detector photocell 32, which is positioned opposite horizontal slit 30 in the detector head, relative to the scanning disc 38 as shown in FIG. 2. The scanning disc and its downward projecting pin permit a relative vertical movement of the detector head with the scan disc so that as the helical bourdon expands longitudinally, vertical movement of the head relative to the scanning disc is permitted. As the scanning disc is being rotated by the motor 34 and gear train 35, it moves the light source 41 opposite the slit 30 in the detector head to cause light to impinge upon the detector photocell detector 46 positioned above the scanning disc is similarly energized. Thus, as the scanning motor drives the disc 38 and its light source 41 past the case reference slit 48 and detector 46 and also past the slit 30 and detector 32 in the detector head, a pair of signals are generated by the photodetectors which will be hereinafter referred to as a case reference signal and pressure signal.

The gear train 35 which is used to transmit rotative motion of motor 34 to the scan disc 38, is comprised of nonlinear gears. Thus, if the gears were permitted to continuously rotate in one direction, the precise position of the scan disc with respect to the reference and pressure photocells would vary with repetitive use. In order to insure that the scan unit maintains a precise relation with the detectors on repetitive sweeps, provisions are incorporated in the scan motor circuit to aleviate this problem as will be hereinafter described.

Figure 3:
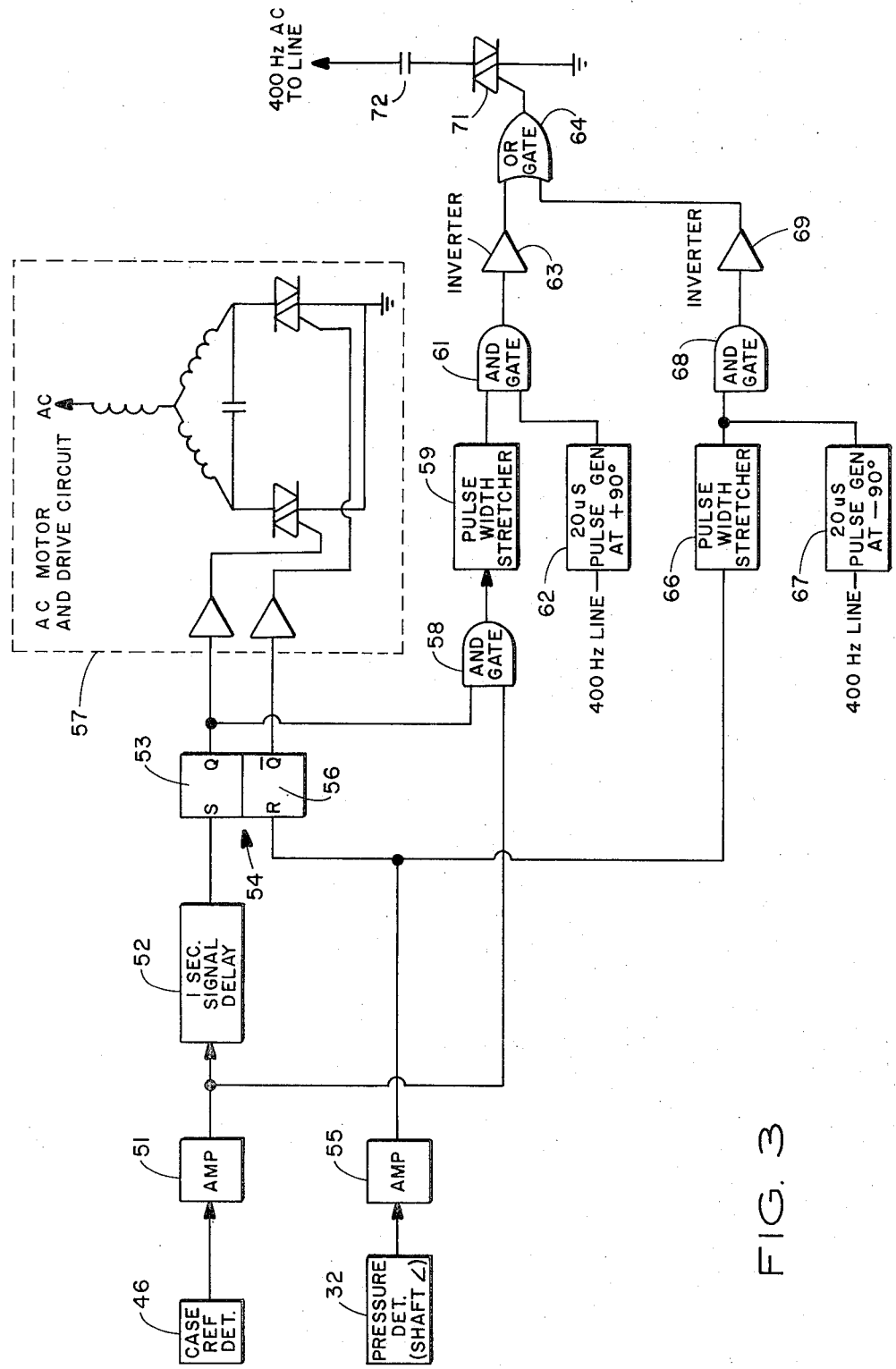
FIG. 3 is a circuit block diagram of a downhole electronics system for detecting data and converting such data to a signal for transmission over a conductor to the surface.

Referring to FIG. 3 of the drawings, a circuit for receiving the case reference signal and pressure signal for coding and transmittal to the surface is shown. The output of the case reference detector is connected by means of a circuit path to an amplifier 51 for amplification. The output of the amplifier is fed to a one second signal delay device 52 which is made up of a series of "one shots," the purpose of which is to delay the amplified signal one second. The output of the one second signal delay is to the set side 53 of a set reset flip flop 54.

The pressure signal which is a measure of the amount of rotation of the bourdon tube shaft or shaft angle, is also fed to an amplifier 55 which amplifies the signal and sends it to the reset side 56 of the set reset flip flop 54. The output of the set reset flip flop is to an AC motor being a reversible motor which is driven in opposite directions by the changing output of the flip flop 54. The AC motor 34 is used to drive the scanning system in the downhole instrument with the reversing feature to be described later.

Referring again to FIG. 1, the output of the case reference detector amplifier 51 is also fed to an AND gate 58. The other input to the AND gate comes from the output of the set portion 53 of the set reset flip flop 54. The output of the AND gate 58 is fed to a case reference pulse width stretcher 59. The operation of the AND gate 58 is described as follows:

A pulse is only passed from the case reference detector amplifier 51 to the case reference pulse width stretcher 59 when the AND gate 58 operates. The reason for this is that the reversing motor 34 drives the scanning disc 38 until an output from one of the detectors 46 or 32 is received whereupon the motor 34 is reversed. In the instance of a light signal to the case reference detector 46, the motor reversal takes place one second after the reference signal is detected as a result of the one second delay. However, when the light from the scanning disc 38 activates the pressure detector 32, the motor immediately reverses to drive the scanning disc in an opposite direction until it moves past the case reference detector 46 for one second, whereupon it reverses again.

In order to measure the proper shaft angle between the case reference detector and the pressure detector, which in turn is proportional to the pressure being measured, it is necessary to start the timing after the scanning disc has been delayed one second, reversed, and come back to the case reference detector. Thus, when the output of the case reference amplifier 51 reaches AND gate 58, the one second delay in the output of the set side 53 of flip flop 54 to the other side of AND gate 58 prevents the AND gate from operating during the one second delay. However, when the scanning motor reverses, after the one second delay, and returns the scanning disc and lamp 41 to the case reference detector, this output from the amplifier 51 into AND gate 58 finds the other input of the AND gate open by the previous output of flip flop 54 and thus AND gate 58 passes a pulse to the pulse width stretcher 59.

The reasons for reversing the scan disc motor as described above is as follows: the gear train 35, which is interposed between motor 34 and the output shaft, is non-linear and in order to insure repetition in the output reading, the scan system must detect the reference detector and pressure detector with the gear teeth having the same relationship to one another in each scan. To insure the maintenance of this gear relationship the motor is reversed at the end of each scan and run until the starting reference detector is crossed. Consequently the starting reference and every other point of the scan will fall into the same gear tooth pattern, with every scan. This technique insures repetition in the read out.

The case reference pulse width stretcher 59 is comprised of a series of one shots which stretch the pulse to a 0.003 second pulse. The length of the output pulse from the stretcher 59 is set to be larger than the period of the power supply which is 0.0025, the power supply being 400 cycles per second. The output of the pulse width stretcher 59 is fed to one side of an AND gate 61. The other side of AND gate 61 is driven by the output from a 20 microsecond pulse generator 62 which is also made up of a series of one shots and is driven by the 400 cycle line power. This pulse generator 62 is arranged to provide a 20 microsecond pulse at the positive 90° portion of the power supply signal. Since the 20 microsecond pulse must appear during the 0.0025 period of the line power, this arrangement insures that at least one pulse will be passed through AND gate 61 since the other input to the AND gate is greater than 0.0025 seconds. The output of AND gate 61 which is a 20 microsecond pulse is fed to an inverter 63 which inverts the pulse and feeds it to an OR gate 64. The other input to the OR gate is from a similar circuit to the one just described which is powered by the output from the pressure detector amplifier 55 passing through a pulse width stretcher 66 which likewise stretches the pulse to 0.003 seconds. A 20 microsecond pulse generator 67 provides a 20 microsecond pulse at the −90° portion of the power signal which is fed to an AND gate 68 together with the 0.003 second signal from pulse width stretcher 66. The output of the AND gate is to an inverted 69 which inverts the signal and passes it to OR gate 64. The output of the OR gate 64 is to a Triac 71 which is placed in series with capacitor 72 in the power supply circuit. The circuit just described insures that at least one 20 microsecond pulse will occur on the OR gate 64 during each 0.003 second. This pulse is supplied by either the case reference detector 46 or the pressure detector 32. Thus, an output signal is generated which includes the pulses occurring at the positive and negative 90° portions of the power signal which in turn represents the time between data spikes, with this time being proportional to the shaft angle of the bourdon tube.

Figure 4:
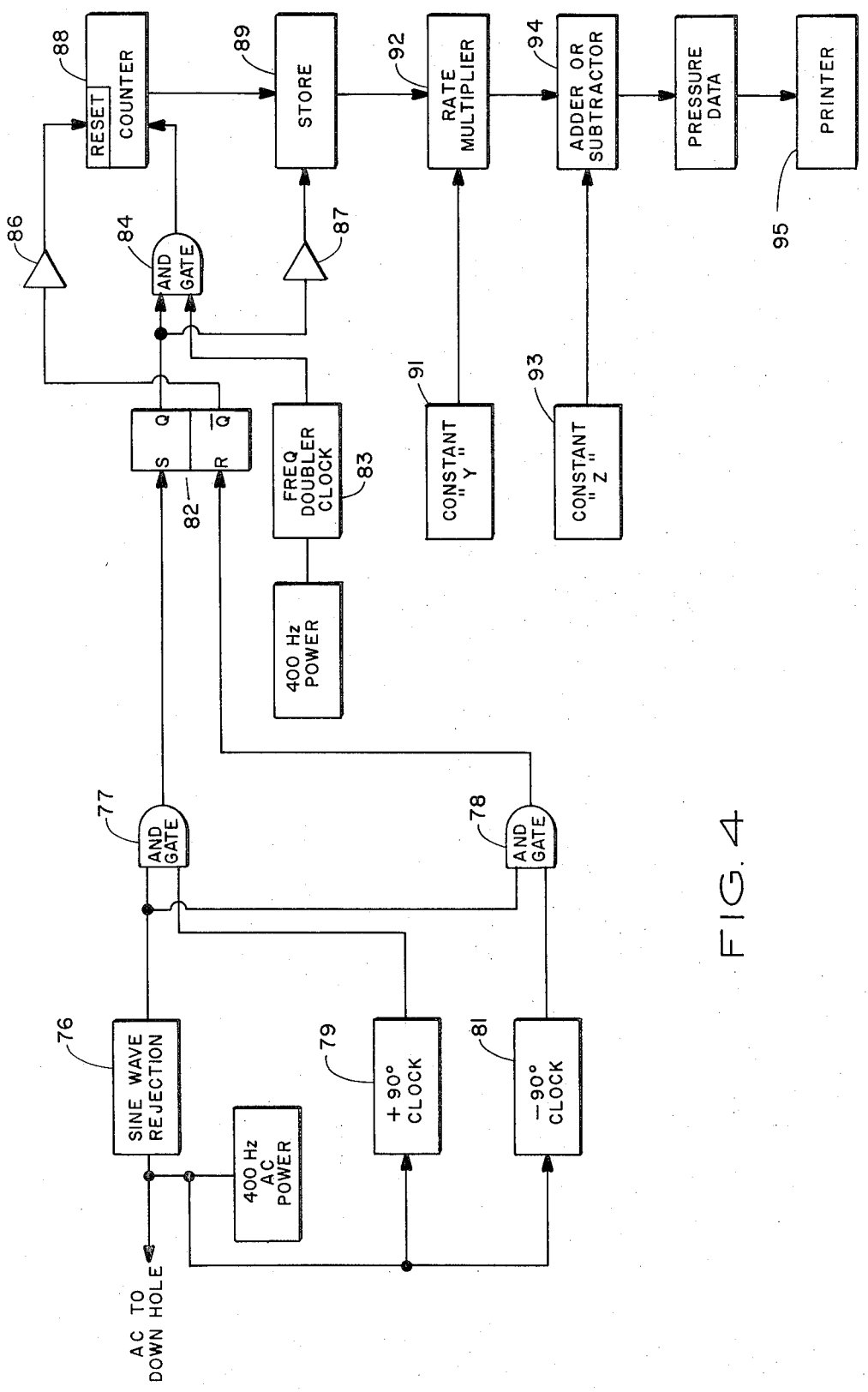
FIG. 4 is a surface recorder circuit for decoding data transmitted over the conductor and converting it to information indicative of a measured downhole parameter.

Referring next to FIG. 4 of the drawings, the uphole portion of the circuitry is shown comprising decoder and computation circuit. The AC line signal to and from the downhole circuit and having the data signals superimposed thereon is shown being fed to a sine wave rejection circuit 76 which removes the sine wave and provides an output consisting of only data pulses corresponding to the positive and negative 90° portion of the power supply. This output signal is fed to a positive logic AND gate 77 and a negative logic AND gate 78. The other inputs of the AND gate 77, 78 consists of a signal from a positive 90° clock 79 and a negative 90° clock 81, respectively, which are driven by the 400 cycle AC power supply. The outputs of the clocks are positive square waves corresponding to the positive or negative 90° portions of the 400 cycle sine wave. For example, when the +90° clock signal is fed to the positive logic AND gate 77 any pulses outputting from the sine wave rejection circuit which correspond to the positive going portion of the power supply are passed by the AND gate 77 to the set side of a set-reset flip flop 82. Likewise, the negative logic circuit also passes those data pulses which occurred on the negative going portion of the power supply signal which in turn correspond to the pressure detector. This output is fed to the reset side of the set-reset flip flop 82.

The flip flop is shown supplying its output to a computation circuit portion of the surface equipment for computing pressure from the downhole data signals. This surface equipment includes a frequency doubler 83 which receives a 400 cycle line power input to produce an 800 cycle clock output which in turn is passed to an AND gate 84. The count of data pulses for calculating pressure is obtained by incrementing a counter register 88 with the 800 cycle clock gated by AND gate 84. AND gate 84 is operated by the "Q" output from flip flop 82. "Q" is set by the case reference detector positive going data pulses from AND gate 77 and is reset by the pressure detector data pulses from AND gate 78. Therefore, the value in counter register 88 is the value of time it takes the downhole scanning disc to move between the case reference detector and the pressure detector. When $\overline{Q}$ of flip flop 82 goes to a zero, one shot 86 resets the counter 88. When Q of flip flop 82 goes to a zero, one shot 87 operates to store the contents of the counter 88 in a storage unit 89.

In order to calculate the pressure from the information derived from the downhole mechanism, calculations are performed on the stored information which in indicative of pressure to provide an output of pressure directly in pounds per square inch. The data calculation logic is (Y · Count ± Z = Pressure). "Y" is a constant derived from a previous calibration, and is equal to the slope of the bourdon tube used to sense the pressure in the downhole environment. "Z" is the displacement of the pressure detector photocell with respect to the case reference photocell at atmospheric pressure. The constant "Y" is entered into the calculations by means of a thumb wheel switch 91. This constant together with the count stored 89 are multiplied together in a rate multiplier 92. The constant "Z" is entered into the calculation by means of a thumb wheel switch 93, with this value being then added or subtracted by means of an adder or subtractor device 94 to or from the results of the rate multiplier output to obtain pressure data which is then displayed or printed out as by printer 95. Completion of a calculation actutated the printer 95 which prints the real time count and calculated pressure.

A summary of the operation of the entire system is described as follows:

In the downhole instrument the bourdon tube is subjected to pressures which cause expansion within the tube and rotation of the shaft 22. This in turn causes rotation of a detector head 26 having a pressure detector photocell 32 positioned therein. Movement of the detector head moves the pressure detector photocell 32 angularly with respect to a case reference photocell 46 which is fixedly attached to the instrument housing. A scan disc motor drives a scanning disc 38 and light source 41 periodically past the case reference and pressure detector photocells causing these photocell detectors to output a signal which is determinative of the angular distance between the two photocells. This angular difference is then related to the pressure being detected as will be hereinafter described. Respective signals from the case reference detector 46 and pressure detector 32 are amplified with the case reference signal being sent to a time delay circuit 52 for delaying the signal one second. This delayed signal is used to set the Q output from a flip flop 54 to "1." This output is used to operate a Triac in the scan motor circuit to rotate the motor in a clockwise direction.

As the scan motor moves the scanning device past the pressure detector photocell 32, the signal generated thereby is amplified at 55 and then sent to the reset side of flip flop 54. This in turn sets the $\overline{Q}$ of the flip flop to "1" turning on another Triac in the motor circuit to cause the scanning motor to reverse its direction.

When the scanning disc 38 moves the light 41 past the case reference photocell 46 in a clockwise (measuring cycle) direction, its amplified output is "ANDED" with "Q" from flip flop 54. The resulting pulse duration from AND gate 56 is set to 0.003 seconds by means of a pulse width stretcher 59 which is used to release one −90° clock pulse from a pulse generator 62. This −90° clock pulse is passed through AND gate 61 and is inverted at 63 whereupon it is fed to OR gate 64. Operation of OR gate 64 turns on a Triac 71 at the −90° point on the power cycle to short the 400 cycle power to ground through a capacitor 72. The Triac 71 goes out of conduction when capacitor 72 fully charges. This momentary short in the power supply places a spike on power supply at the −90° position.

When the scanning disc lamp 41 crosses the pressure detector photocell 32, the resulting pulse is amplified at 55 and fed to flip flop 54. This same amplified signal is also furnished to pulse width stretcher 66 which operates AND gate 68 to release a +90° clock pulse from pulse generator 67. The positive 90° gated clock pulse in then inverted at 69 and fed to OR gate 64. Again the operation of OR gate 64 turns on Triac 71 at the +90° point in the power signal to short the 400 cycle power signal to ground through capacitor 72. Again Triac 71 goes out of conduction when capacitor 72 fully charges and the result is a spike on the power supply at the +90° position.

Pulse generators 62 and 67 generate 20 microsecond pulses to control the timing of the firing of the Triac 71. The outputs are derived from the 400 cycle line voltage for synchronization of the output data pulses.

On the return sweep of the scan disc the case reference photocell 46 again detects the lamp 41 on the scanning disc. However, "Q" from flip flop 54 is a zero and therefore the pulse from amplifier 51 does not pass through AND gate 58 thus preventing a false trigger.

The one second delay of the case reference pulse to the flip flop 54 is to permit the scan to pass the case reference photocell significantly to permit the motor to come up to a speed after turning around and before crossing the case reference photocell again, to put a data signal pulse on the 400 cycle power line.

Referring again to the data signal the 400 cycle power signal with the data pulses superimposed thereon is then fed at the surface to the sine wave rejection circuit 76 which strips the carrier wave, leaving only data pulses. The 400 cycle power is also fed into two clock circuits 79 and 81, with clock 79 supplying a 180° signal corresponding to the positive half of the 400 cycle sine wave while clock 81 supplies a 180° signal corresponding to the negative half of the 400 cycle sine wave. The data pulses from the sine wave rejection circuit are AND gated at 77 and 78 with the clocks 79 and 81. The resulting pulse from gate 77 is the set pulse for flip flop 82 and the resulting pulse from gate 78 is the reset pulse for flip flop 82.

As described above the output of the flip flop 82 drives a counter which counts the pulses representative of angular rotation of the bourdon tube shaft. Calculation utilizing constants are performed to convert the count into pressure data which is outputted at 95.

While a particular embodiment of the present invention has been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. In a parameter measuring apparatus for use in wellbore, means for detecting parameter changes including a detecting element rotatable in response to such parameter changes, means responsive to such detected changes for moving the detecting element in a first plane, scan means for detecting the movement of said detecting element in said first plane, said detecting element being linerally movable relative to said scan means, and means providing for relative movement of said detecting element and said scan means in a second plane normal to said first plane to thereby insure interference free relative movement of said detecting element and scan means.

2. The apparatus of claim 1 wherein said parameter is pressure and said detecting means is a bourdon tube arranged to rotate said detecting element in response to pressure changes.

3. The apparatus of claim 1 and further including a housing for such apparatus, first switch means fixed to said housing and switch means on said detecting element, and switch activating means on said scan means.

4. The apparatus of claim 3 and further including motive means for rotating said scan means, and means responsive to said switch means for operating said motive means.

5. In an apparatus for measuring borehole parameters, a housing means in said housing for detecting changes in a borehole parameter, first and second switch means mounted for relative movement within said housing, means responsive to detected changes for moving one of said switch means relative to the other, switch activating means movable in opposite directions within said housing and, reversible motor means for driving said switch activating means, said first and second switch means being respectively arranged to drive said motor means in opposite directions.

6. The apparatus of claim 5 wherein said first switch means is mounted on said housing, with said second switch means being movable in response to detected changes.

7. The apparatus of claim 5 wherein said means for detecting parameter changes is a bourdon tube pressure element, and further including a shaft extending from said element and arranged to rotate in response to pressure changes, a shaft mount on said shaft, said second switch means being positioned on said shaft mount.

8. The apparatus of claim 7 including a scanning disc driven by said motor and wherein said switch activating means is mounted on the scanning disc.

9. The apparatus of claim 5 wherein said first and second switch means are light sensitive devices and said switch activating means is a light source.

10. In an apparatus for measuring downhole pressure including an instrument housing, means for detecting pressure, downhole means operated by said pressure detecting means for providing a first signal, downhole means providing a second signal for time reference to said first signal, single conductor means for providing a power signal from the surface to the apparatus for measuring downhole pressure and for transmitting said signals to the surface, means for superimposing said first and second signals on the power signal carried on said conductor means in timed relation to the phase of the power signal, surface means for determining the same relation between said first and second signals, and means for computing downhole pressure from the time relation between said first and second signals.

11. The apparatus of claim 10 wherein said surface means and computing means includes count pulse generating means for counting the pulses generated by said pulse generating means between said first and second signals, and means for storing the count obtained by said counting means.

12. An apparatus for measuring downhole pressure including, a pressure sensitive device, means responsive to said pressure sensitive device for providing first and second signals, single conductor means for transmitting a power signal having a phase from the surface to said means for providing first and second signals, means for superimposing said first and second signals on said power signal for transmission to the surface, said first and second signals being superimposed upon said power signal in timed relation to the phase of said power signal.

13. The apparatus of claim 12 and further including surface means for detecting said first and second signals.

14. The apparatus of claim 13 wherein said detecting means is clocked by the phase of said power signal.

15. The apparatus of claim 13 and further including pulse count means and pulse generating means at the surface, and means responsive to said first and second signals for passing pulses from said pulse generating means to said pulse count means.

* * * * *